C. J. Holman,

Making Stares.

No. 2,471. Reissued Jan. 29. 1867.

Witnesses:

H. B. Jackson

Joseph Perry

Inventor:

Calvin J. Holman

AM. PHOTO-LITHO. CO. N.Y. (OSBORNE'S PROCESS.)

United States Patent Office.

SPARROW M. NICKERSON, OF CHICAGO, ILLINOIS, ASSIGNEE OF CALVIN J. HOLMAN.

*Letters Patent No.* 40,837, *dated December* 8, 1863; *reissue No.* 2,471, *dated January* 29, 1867.

IMPROVEMENT IN SAWING MACHINES.

The Schedule referred to in these Letters Patent and making part of the same.

TO ALL WHOM IT MAY CONCERN:

Be it known that CALVIN J. HOLMAN, of Oshkosh, in the county of Winnebago, and State of Wisconsin, hath invented a certain new and useful Improvement in Stave-Sawing Machines, for which Letters Patent of the United States were issued to him, bearing date on the eighth day of December, in the year of our Lord one thousand eight hundred and sixty-three; and I, SPARROW M. NICKERSON, sole assignee of said patent, of Chicago, in the county of Cook, and State of Illinois, do hereby declare and make known that the following is a full, clear, and exact description of the same, reference being had to the accompanying drawings, and the letters and figures marked thereon, which form part of this specification.

To enable those skilled in the art to understand how to construct and use this invention, I will proceed to describe its construction and operatien with particularity, making reference in so doing to the aforesaid drawings, in which—

Similar letters of reference in the several figures denote the same parts of the invention or machine.

Figure 1:
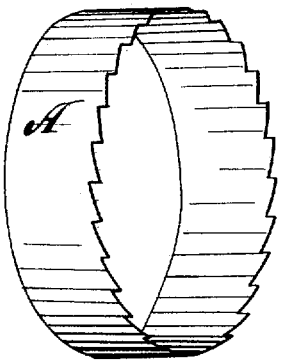
Figure 1 represents a perspective view of the saw.
Figure 2:
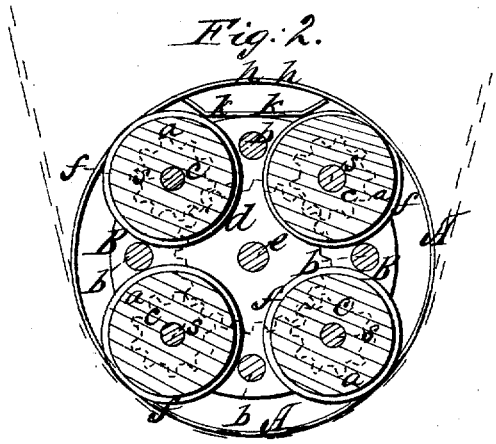
Figure 2 is a transverse section taken at the line *x y*, in fig. 3.
Figure 3:
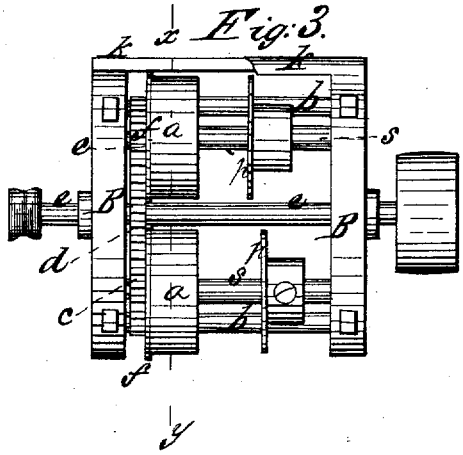
Figure 3 is a side elevation of the machine, the saw being removed.

The saw is of a cylindrical form, as shown at A in the drawings, having teeth upon one end, which saw is supported and kept in the required circular form by means of a system of friction-rollers or drums, marked *a*, arranged within it. The shafts *s* of the said friction-rollers, which sustain the saw in position, are arranged and supported in suitable boxes in the circular end pieces B, which are connected together by means of bars *b*. The said rollers or drums *a* have flanges *f* upon the rear end, so as to prevent the saw from sliding off when in operation. Each of said supporting rollers is constructed in two parts, or rather there are two supporting rollers on each shaft *s*, the one next to the teeth of the saw being adjustable by means of a set-screw by which it is secured to the shaft, and being placed at a short distance from the other roller, it can be moved back as the saw wears out and becomes narrower. Upon the shafts of the supporting rollers are pinions *c* which gear into the pinion *d* upon the shaft *e*, whose axis coincides with the axis of the saw. No frame is represented to support the machinery herein shown and referred to, which may be arranged upon any suitable frame. The saw may be driven by means of a belt upon the drum upon the shaft *e*, or by a belt passing directly around the saw, which I consider the preferable mode, and in that case the revolution of the saw upon the rollers within may be utilized as a power by means of the shaft *e*, and a drum or gear-wheel upon it to propel the carriage which feeds the stave-bolt to the saw, or for any other purpose. In fig. 2 the position of the belt around the saw is indicated by dotted lines. The rollers arranged within the saw will also serve to brace and keep the saw in the proper shape under the pressure of the belt, and to otherwise strengthen and regulate its operation. The pinions *c c c c* and *d* may be dispensed with if desired, having the motion of the rollers communicated to the drum shaft *e* by means of frictional gearing in such case. The bolt or piece of wood to be sawed is fed to the saw at *h h* upon any suitable reciprocating carriage, and the staves as they are cut fall upon the table or rest *k k*. from which they will be pushed by the succeeding pieces as they are cut.

Having described the construction and operation of this invention, I will specify what I claim, and desire to secure by Letters Patent:

1. I claim supporting the saw upon the rollers *a p* within the saw, one of which is adjustable, so as to adapt the rollers to the wearing out of the saw, substantially as herein described.

2. I claim so arranging the saw A upon interior supporting rollers and their shafts in such a manner that the saw A, revolved by a band passing around it, as before mentioned, will communicate power, through the medium of the interior rollers and shafts, to other parts of the machine or other machines, substantially as herein specified and shown.

SPARROW M. NICKERSON.

Witnesses:

W. E. MARRS,

J. L. COBURN.